(12) United States Patent
Fandel

(10) Patent No.: US 8,413,957 B2
(45) Date of Patent: Apr. 9, 2013

(54) SYSTEMS AND METHODS AND METHODS FOR VALVE CONTROL

(76) Inventor: Stephen John Fandel, Coon Rapids, MN (US)

( * ) Notice: Subject to any disclaimer, the term of this patent is extended or adjusted under 35 U.S.C. 154(b) by 555 days.

(21) Appl. No.: 12/638,333

(22) Filed: Dec. 15, 2009

(65) Prior Publication Data
US 2011/0140020 A1  Jun. 16, 2011

(51) Int. Cl.
*F16K 31/00* (2006.01)

(52) U.S. Cl.
USPC ....... 251/293; 251/294; 251/248; 137/315.38

(58) Field of Classification Search .................. 251/248, 251/291, 292, 293, 294; 137/315.38; 74/505, 74/506
See application file for complete search history.

(56) References Cited

U.S. PATENT DOCUMENTS

| | | | | |
|---|---|---|---|---|
| 938,613 A * | 11/1909 | Sieben | ........................... | 137/77 |
| 1,181,565 A * | 5/1916 | Block | ........................... | 81/124.2 |
| 2,021,587 A * | 11/1935 | Agner | ........................... | 251/227 |
| 4,446,763 A | 5/1984 | Blough | | |
| 4,509,387 A * | 4/1985 | Tschanz et al. | ................. | 74/505 |
| 4,970,912 A * | 11/1990 | Wolf | ........................... | 74/501.6 |
| 5,074,162 A * | 12/1991 | Yanusko | ....................... | 74/501.6 |
| 5,381,706 A * | 1/1995 | Yanusko et al. | ................. | 74/505 |
| 5,456,278 A | 10/1995 | Morris | | |
| 5,482,251 A * | 1/1996 | Roberts | ......................... | 251/288 |
| 5,609,324 A * | 3/1997 | Pinkney | ......................... | 251/292 |
| 5,699,701 A | 12/1997 | Cotten, Jr. | | |
| 5,711,511 A * | 1/1998 | Cynar | ........................... | 251/293 |
| 5,724,854 A * | 3/1998 | Chen | ............................ | 74/89.21 |
| 5,727,772 A | 3/1998 | Rothammer | | |
| 5,794,488 A * | 8/1998 | Yanusko | ....................... | 74/502.6 |
| 6,119,563 A | 9/2000 | Fleck | | |
| 6,186,475 B1 * | 2/2001 | Selepouchin | .................. | 251/293 |
| 7,255,327 B2 | 8/2007 | Houghton | | |
| 2004/0113116 A1 * | 6/2004 | London et al. | ................. | 251/294 |

OTHER PUBLICATIONS

Product brochure, Elkhart Brass Mfg. Co., Inc., Apparatus Fittings section, pp. 8-3 to 8-5. www.elkhartbrass.com, 800-346-0250. (Submitted herewith.).

* cited by examiner

*Primary Examiner* — John K Fristoe, Jr.
*Assistant Examiner* — Matthew W Jellett
(74) *Attorney, Agent, or Firm* — Underwood & Associates, LLC

(57) ABSTRACT

Valve controllers and methods of their use are described. Valve controllers of the type described herein can be used to operate valves that are out of manual reach by the operator. One embodiment of a valve controller includes proximal and distal controller heads connected to each other via a hollow elongate shaft. Each of the proximal and distal controller heads includes a rotatable pulley wheel that is connected to a valve control engagement member for engaging a handle of a valve operable to shift the valve from a first position to a second position. The rotation of the proximal and distal pulley wheels, and thereby the proximal and distal engagement members, is coupled via a cord that runs through the hollow elongate shaft and around a circumferential portion of each pulley wheel. In one general aspect, a user can operate a valve by positioning the distal valve control engagement member of the distal controller head over the valve handle, and rotating the proximal engagement member, causing the distal engagement member, and thereby the valve handle, to shift.

24 Claims, 13 Drawing Sheets

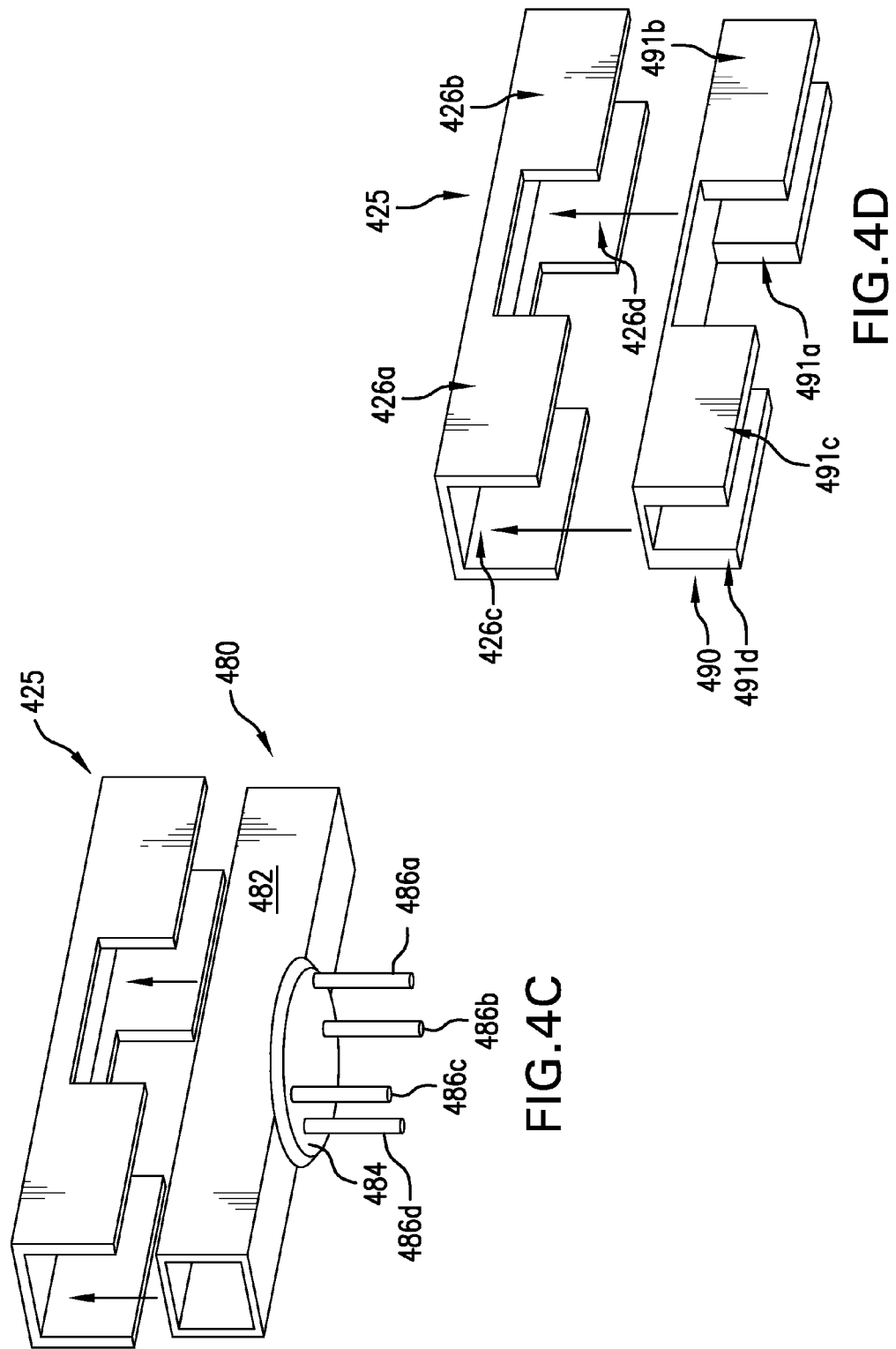

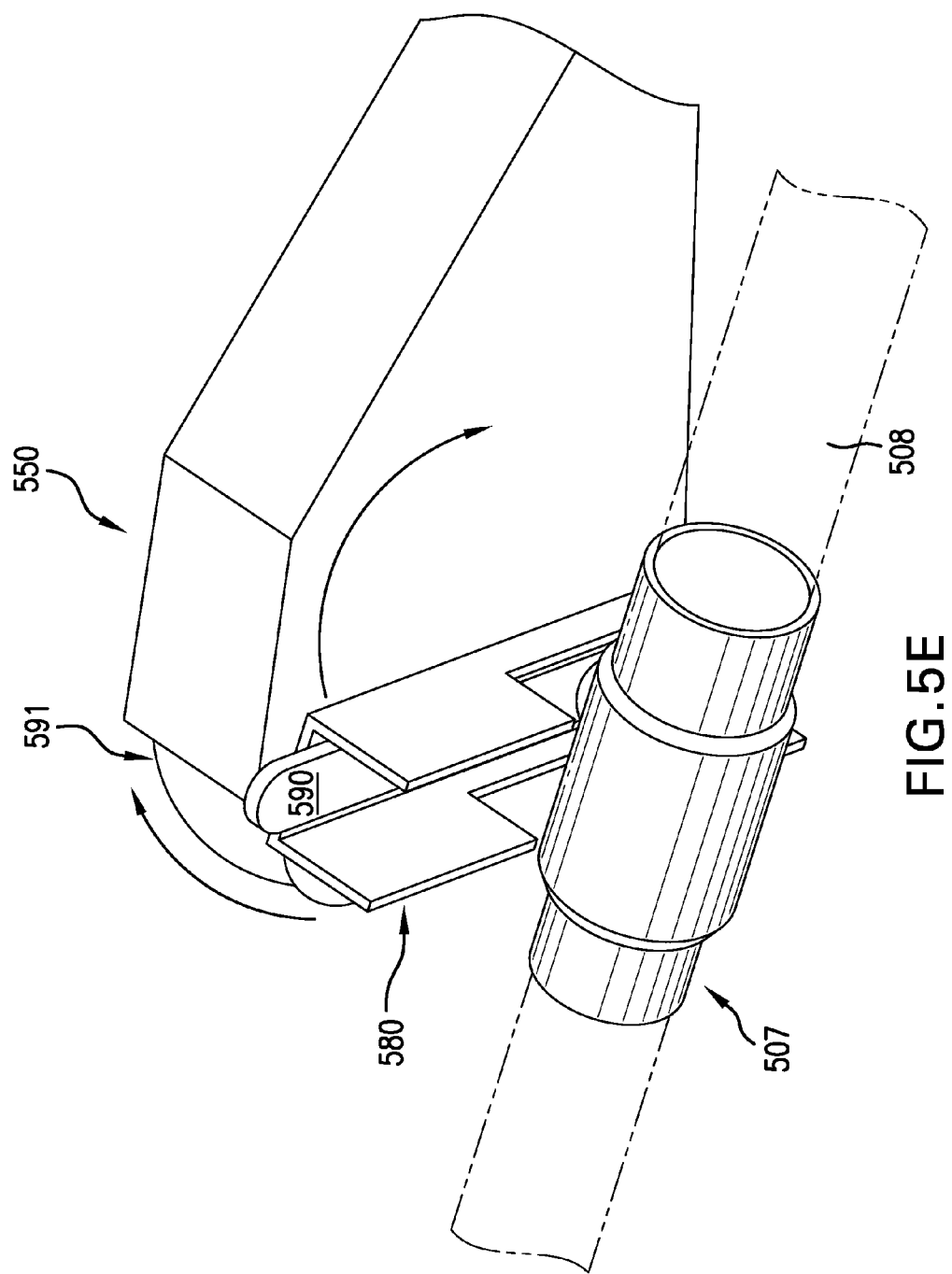

SYSTEMS AND METHODS AND METHODS FOR VALVE CONTROL

BACKGROUND

Valves generally regulate flow of a fluid, such as a liquid or gas, by controllably obstructing a fluid path within a passageway. Valves can be operated by various control mechanisms, such as electronic or pneumatic sensors, fluid pressure, levers, pedals, and by hand. The size and shape of valves vary depending on their intended use and, similarly, may be constructed out of materials that prevent reactivity with the fluid or provide resilience in pressurized systems.

SUMMARY

In general, according to one embodiment, a valve controller is provided. The valve controller includes proximal and distal controller heads connected to each other via a hollow elongate shaft. Each of the proximal and distal controller heads includes a rotatable pulley wheel that is connected to a valve control engagement member for engaging a handle of a valve operable to shift the valve from a first position to a second position. The rotation of the proximal and distal pulley wheels, and thereby the proximal and distal engagement members, is coupled via a cord that runs through the hollow elongate shaft and around a circumferential portion of each pulley wheel. In one general aspect, a user can operate a valve, e.g., a valve that is out-of-reach, by positioning the distal valve control engagement member of the distal controller head over the valve handle, and rotating the proximal engagement member, causing the distal engagement member, and thereby the valve handle, to shift.

In general, according to another aspect, a valve controller is provided. In one embodiment, the valve controller includes a first head housing and a second head housing, where each of the first and second head housings includes first and second housing walls and a pulley wheel. The pulley wheel is supported by an axle fastened to the first wall and extends through the second wall. The portion of the axle that extends through the second wall is fastened to a valve control engagement member that is configured to receive a valve control member operable to control a valve from a first valve position to a second valve position. The valve controller further includes a hollow elongate shaft that conjoins the first and second head housings. A cord extends through the elongate shaft and travels around a circumferential portion of each of the pulley wheels in the first and second head housings, and is configured to transfer, i.e., couple, rotational motion from the pulley wheel in the first head housing to the pulley wheel in the second head housing.

In one embodiment of a valve controller, rotation of the pulley wheels causes concurrent rotation of each of the valve control engagement members about a rotation axis substantially coaxial with a rotation axis of the axle.

In another embodiment a portion of the elongate shaft includes a bend configured to allow the first valve control engagement member to be rotated in a different plane of rotation than the second valve control engagement member.

In one embodiment, the hollow elongate shaft includes two or more hollow shaft portions conjoined by joint member for selectively varying a bend angle of the elongate shaft.

In one embodiment of the above valve controller, the circumference of each pulley wheel is different.

In one embodiment, one of the pulley wheels includes additional, stacked pulley wheels having different groove circumferences and shares a common rotation axis with the pulley wheel. This configuration can provide a selectable mechanical advantage between the first and second pulley wheels.

In one embodiment, the cord is a rope, chain, cable, belt, or wire that can shift in response to rotation of the first pulley wheel and produces rotation in the second pulley wheel.

In one embodiment, the valve control engagement member can be configured to receive a valve handle that is rotatably operable to regulate fluid flow through the valve. In such an embodiment, in one aspect, the valve control engagement member can be an elongate, substantially U-shaped member. In another aspect, the axis of rotation of the valve control engagement member can be located substantially at the mid-length of the U-shaped member.

In yet another aspect, the valve control engagement member can be configured to receive the control handle of a ball valve, butterfly valve, globe valve, plug valve, or gate valve. In yet another aspect, the valve handle can be a lever or a hand wheel. In yet another aspect, the valve control engagement member can be configured to securely receive an accessory engagement member. The accessory engagement member can be configured to receive a valve handle of different shape or size than the valve control engagement member.

In another embodiment, the first and second valve control engagement members are on opposite sides of the elongate shaft.

In another embodiment, rotation of the axle of the first or second control head can be powered by an external engine or battery power.

In another embodiment, the pulley wheels can rotate 360 degrees, and in other embodiments, the pulley wheels can rotate greater than 360 degrees.

In one embodiment, the valve controller further includes one or more pegs extending perpendicularly from a periphery of one of the first or the second walls. The pegs can be configured to engage a pipe that is coupled to the valve in order to reduce counter-torque produced by rotating the valve control member. In an alternative arrangement of this embodiment, the pegs can be integrally fastened to a hinge member, where the hinge member is fastened to one or more of the first or second walls. The hinge member can be configured to allow the position of the pegs to be adjusted in a deployed or non-deployed position.

In one embodiment, the elongate shaft comprises a plurality of telescopically-extendable sleeves for adjusting the length of the elongate shaft.

In general, according to another aspect, a method for operating a valve is provided. The method includes using a valve controller of the type generally described above, including one or more of its variants or embodiments. The method further includes engaging the valve control engagement member of the first head housing with a valve handle operable to shift a valve flow regulator from a first fluid flow valve position to a second fluid flow valve position. The method further includes rotating the pulley wheel of the second housing to cause the cord to shift and thereby rotate the pulley wheel, the axle, and the engagement member of the first head housing, thereby causing the valve handle to shift from the first fluid flow valve position to the second fluid flow valve position.

In one embodiment of the method, rotating the pulley wheel of the second housing can be accomplished by rotating the second engagement member, or a lever, rigidly fastened to the axle of the second housing.

In one embodiment, the method further includes attaching an accessory engagement member to the valve control engagement member. The accessory engagement member can be configured to receive a valve handle of different size or shape than the valve control engagement member is configured to receive.

In one embodiment, the valve control engagement member is configured to receive the control handle of a ball valve, butterfly valve, globe valve, plug valve, or gate valve.

In one embodiment, the first fluid flow valve position is one that prevents fluid flow through the valve flow regulator and the second fluid flow valve position is one that permits partial fluid flow or complete fluid flow through the valve flow regulator.

In general, according to yet another aspect, a valve controller for operating a valve from a first operating position to a second operating position is provided. The valve controller includes a first valve controller head. The first valve controller head includes a first rotatable pulley wheel supported by a first axle that extends through first and second walls of the first valve controller head and a first rotatable valve control engagement member attached to a terminal end of the first axle. The valve controller further includes a second valve controller head. The second valve controller head includes a second rotatable pulley wheel supported by a second axle that extends through first and second walls of the second valve controller head, and a second rotatable valve control engagement member attached to a terminal end of the second axle. In this embodiment, the first and the second valve controller heads are attached on opposite terminal ends of an elongate hollow shaft such that the first and the second valve control engagement members are on opposite sides of the elongate hollow shaft. A cord is configured to transfer, e.g., couple, rotational motion from the first pulley wheel to the second pulley wheel by simultaneously engaging an outer circumference of each of the first and the second pulley wheels. In this embodiment, the cord runs through the hollow elongate hollow shaft, and the first and second valve control engagement members are configured to receive a valve handle that operates the valve from the first operating position to the second operating position.

In one embodiment of a valve controller, the hollow elongate shaft can be formed of two or more hollow shaft pieces that are joined by an adjustable-angle elbow joint for selecting a bend angle of the hollow elongate shaft. Additionally, the adjustable-angle elbow joint is configured to allow the cord to run therethrough.

In one embodiment, the first and the second valve control engagement members are configured to receive accessory valve control engagement members. The accessory valve control engagement members can be configured to receive valve handles of different type, shape or size than the first or second valve control engagement members.

Certain advantages of the systems and methods include the ability to remotely operate valves that may be out-of-reach of the operator; the ability to operate horizontally- and vertically-mounted valves; the ability to apply additional torque via a mechanical advantage in certain embodiments of a valve controller; the ability to control different types of valves via interchangeable accessory valve control engagement members; the ability to access valves in substantially inaccessible areas through a telescopic elongate shaft, and via an elongate shaft that, in some embodiments, includes an adjustable angle for positioning a distal valve control head relative to a proximal valve control head; among others.

Unless otherwise defined, all technical and scientific terms used herein have the same meaning as commonly understood by one of ordinary skill in the art. Although methods and materials similar or equivalent to those described herein can be used in the practice or testing of any described embodiment, suitable methods and materials are described below. In addition, the materials, methods, and examples are illustrative only and not intended to be limiting. In case of conflict with terms used in the art, the present specification, including definitions, will control.

The details of one or more embodiments are set forth in the accompanying drawings and the description below. Other features, objects, and advantages will be apparent from the drawings and detailed description, and from the claims.

DESCRIPTION OF DRAWINGS

The present embodiments are illustrated by way of example and not limitations in the figures of the accompanying drawings in which like references indicate similar elements, and in which:

FIG. 4C shows an accessory valve control engagement member and a valve control engagement member, according to one embodiment.

FIG. 4D shows an accessory valve control engagement member and a valve control engagement member, according to one embodiment.

FIGS. 5D-5E show one embodiment of a valve controller head and a method for operating a valve using a valve controller.

DETAILED DESCRIPTION OF ILLUSTRATIVE EMBODIMENTS

In general, systems and methods for operating a valve are described. In one illustrative embodiment, a valve controller includes a proximal head and a distal head operably conjoined by an elongate shaft. The proximal head portion includes a first pulley wheel that is rotationally coupled by a looped cord to a second pulley wheel housed within the distal head. The distal head includes a valve control engagement member rotationally coupled to the second pulley wheel and is configured to receive a valve control member such as a valve lever. Valves may be remotely operated, e.g., opened and closed, by rotating the proximal head pulley wheel while the valve control engagement member is engaged with a valve control member, e.g., a valve handle.

Figure 1:
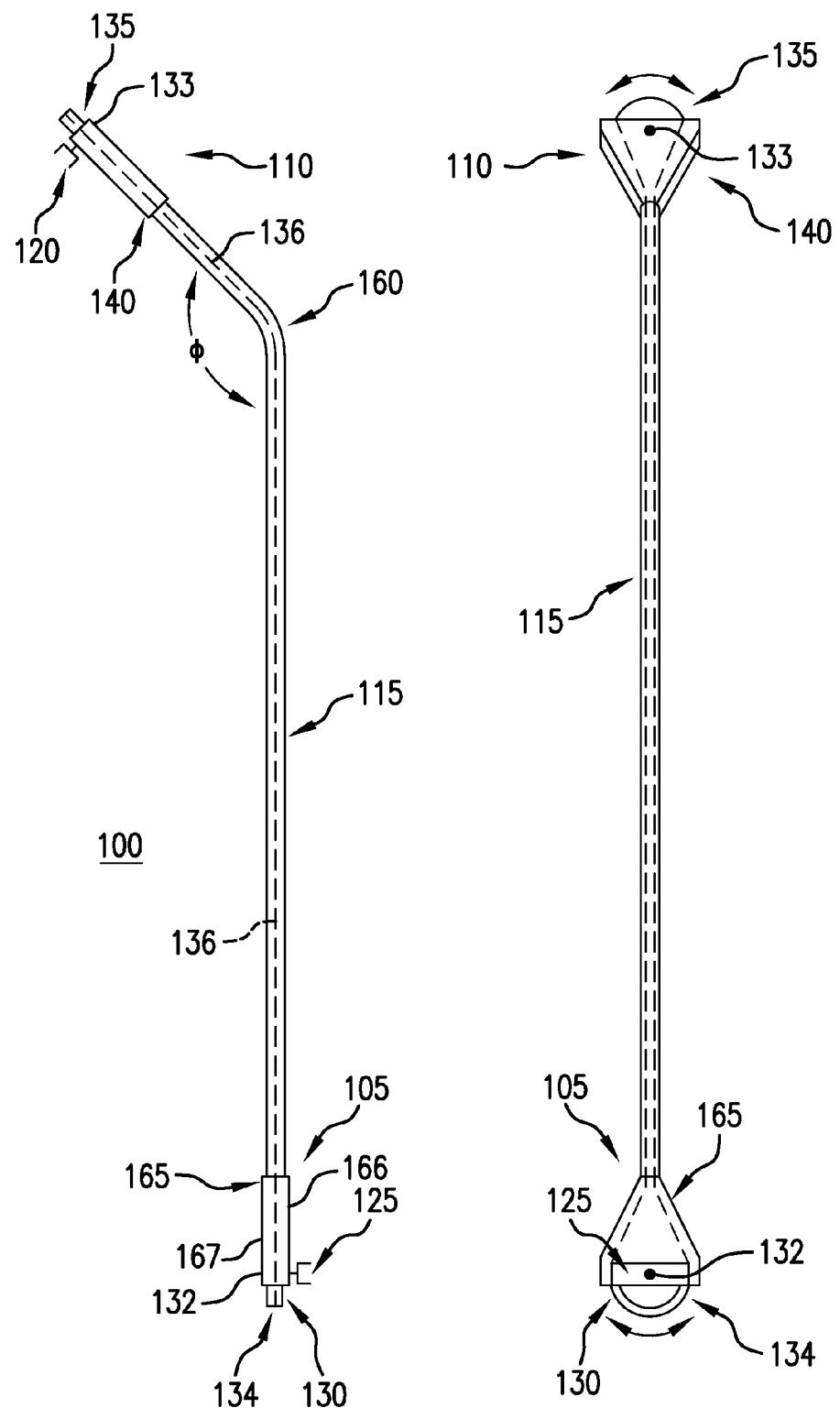
FIG. 1 shows a side and top view of a valve controller, according to one embodiment.

FIG. 1 is a valve controller 100, according to one embodiment. FIG. 1 shows a side-view (left) and a top-view (right) perspective of the valve controller 100. In this embodiment, the valve controller 100 includes a proximal head 105 and a distal head 110 operably connected by an elongate shaft 115. In the following description of illustrative embodiments, the terms proximal head and distal head refer to a head operated by a user (e.g., by hand) and a head that is positioned to engage a valve control, respectively.

The proximal head 105 includes at least two walls, e.g., top and bottom plates (166 and 167, respectively) through which a pulley wheel axle extends. In the embodiment of FIG. 1, the pulley wheel axle is a pin 132 that extends through the rotation axis of a pulley wheel 130 which itself is housed inside the head 105. Variations of pin 132 include sleeves, bolts, shafts, and other cylindrically-shaped rods that provide an axle on which the pulley wheel 130 can rotate while simultaneously anchoring its position within the head housing 165. In this embodiment, pin 132 is fastened to the pulley wheel 130 so that when the pulley wheel rotates it causes synchronous rotation of the pin 132, as described in greater detail below. In some embodiments, the pin 132 and the pulley wheel 130 are keyed. A keyed pin or set screw/pulley wheel combination is one in which the outer axial circumference of the pin 132 and the inner diameter of the pulley wheel 130 axle bore both include a small rectangular channel into which a small rectangular key or set screw is inserted to lock the pin 132 and pulley wheel 130 together. The key or set screw also reduces the likelihood of the pulley wheel 130 slipping on the pin 132, which may result in a loss of rotational coupling therebetween.

One end of the pin 132 is configured to prevent the pin 132 from shifting through the proximal head housing 165. For example, one end of the pin 132 may include a cap having a diameter larger than the diameter of the bore in the head housing 165 through which the pin extends. Alternatively, the pin 132 may be formed with a head portion (not shown in FIG. 1) similar to the striking head portion of nail.

An end portion of the pin 132 is fastened to a surface of a valve control engagement member 125 (described below) such that rotation of the pin 132 causes synchronous rotation of the valve control engagement member 125 about the rotation axis of the pin 132. Pin 132 can be fastened to the engagement member 125 by various methods, including soldering, bolting, riveting, welding, and through use of glues, cements, and other adhesives.

Pulley wheel 130 includes an outer-rim circumferential groove 134 configured to receive a portion of a pulley wire 136. The pulley wire 136 forms a loop that extends from the proximal head pulley wheel 130, through the elongate shaft 115, around a distal head (110) pulley wheel 135, and back to the proximal head pulley wheel 130. In this embodiment, the distal head 110 includes a distal head housing 140 and a pulley wheel 135 that is substantially equivalent in structure and design to the proximal head housing 165 and pulley wheel 130, respectively. The pulley wire 136 can be continuous, or, in some embodiments, sectioned, as described below.

The pulley wire 136 is a cord that forms a loop, or circuit around both pulley wheels 130, 135, and couples the rotation of the pulley wheel (130) in the proximal head 105 to rotation of the pulley wheel (135) in the distal head 110; i.e., as one pulley wheel is rotated, the pulley wire (136) shifts and drives rotation of the other pulley wheel in the valve controller 100.

In some embodiments, other types of cord can be used to couple the rotation of the proximal (130) pulley wheel and the distal (135) pulley wheel. For example, an elongate drive belt (similar to an automotive serpentine belt) may be used. In other examples, rope, chain, cables, wires, cords, and other similar articles may be used. In yet another example, a system of gears and drive shafts may be used to synchronously rotate the pulley wheels in the proximal (105) and distal (110) heads. For example, in one embodiment, the pulley wheel (130) pin 132 is coupled to a gear shaft through a worm drive or a bevel gear, such as a 90-degree miter gear. Rotation of the pin 132 causes the shaft to rotate; the gear shaft can extend through the elongate shaft, terminating at the distal head 110 and operably coupled to the remote pin 133. Rotation of the remote pin 133 causes the distal pulley wheel 135 and hence the distal valve control engagement member 120 to rotate.

The elongate shaft 115 of valve controller 100 includes an angled shaft section 160. The angled shaft section 160 allows the distal head 110 to be optimally positioned over a valve control when the user of the valve controller 100 is beneath the valve (not shown in FIG. 1) as described in greater detail below. In some embodiments, pulley wire guides (not shown in FIG. 1) can be used to reduce the likelihood of abrasive wear on the pulley wire 136 as it shifts through the angled shaft section 160. The angle $\phi$ of the angled shaft section 160 may be selected by a user or manufactured in a fixed-angle configuration to provide convenience and optimal positioning of the distal head 110. In some embodiments, such as that shown in FIG. 1 (left), the elongate shaft 115 is constructed of a continuous piece of piping having a static bend near the distal head 110. In other embodiments, the angled shaft section 160 includes a variable-angle elbow joint that joins two hollow shaft portions together to complete the elongate shaft 115. The pulley wire 136 can freely shift through both hollow shaft sections. In such an embodiment, a user can select an angle $\phi$ for optimal positioning of the distal head 110 relative to a valve control (not shown in FIG. 1). Alternatively, in some embodiments, the elongate shaft 115 is substantially straight from the proximal head 105 to the distal head 110 and does not include an angled shaft section 160. In some embodiments, the elongate shaft 115 can be formed of a series of interconnecting sleeves and is telescopically extendable and retractable to provide variation of the elongate shaft (115) length, similar to a telescopic boom. In this embodiment, the series of interconnecting sleeves are configured to slide together, or into each other, in the manner of the tubes of a jointed telescope, for example.

Figure 2A:
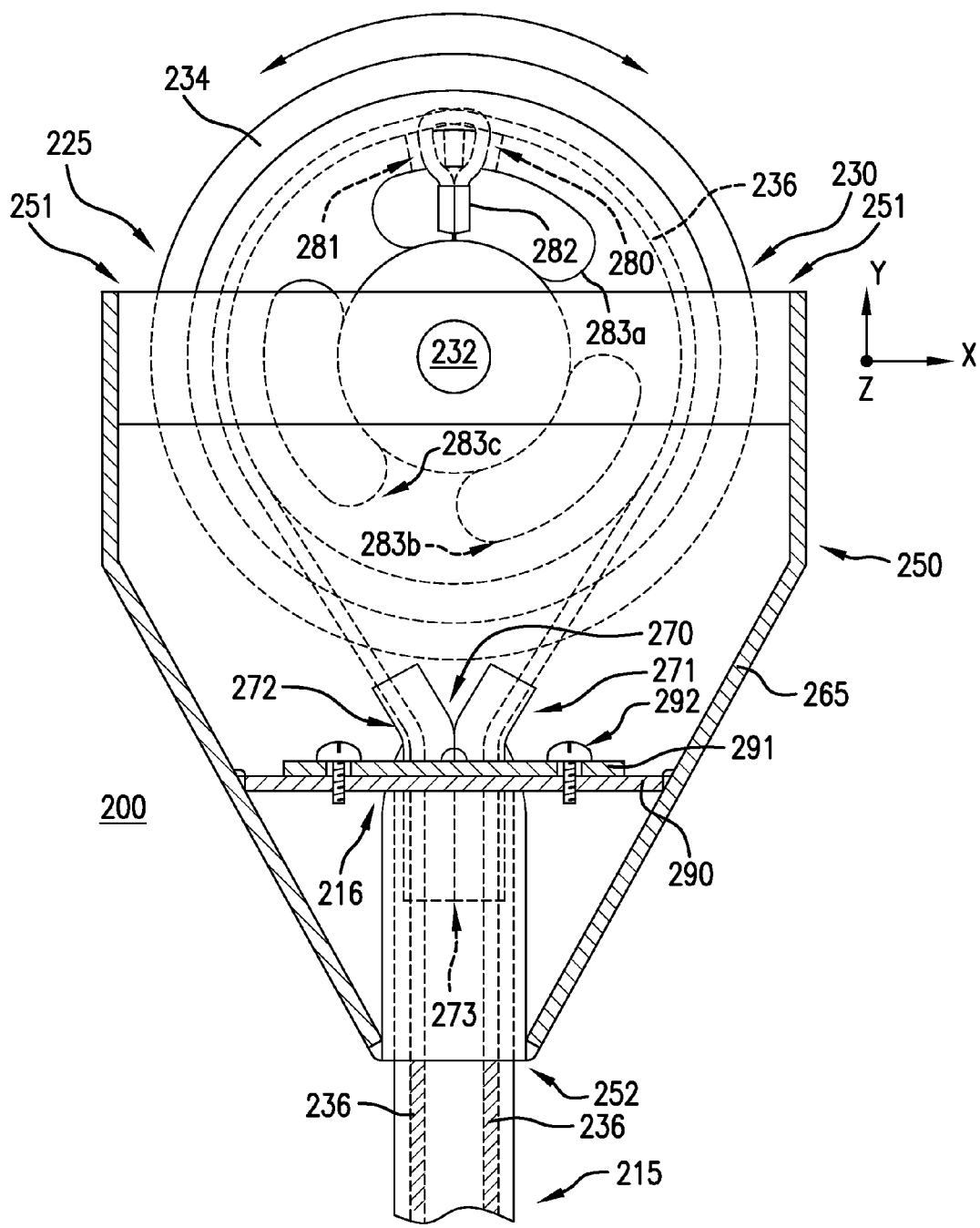
FIGS. 2A and 2B show a side and top view of a valve controller head, respectively, according to one embodiment.
Figure 2B:
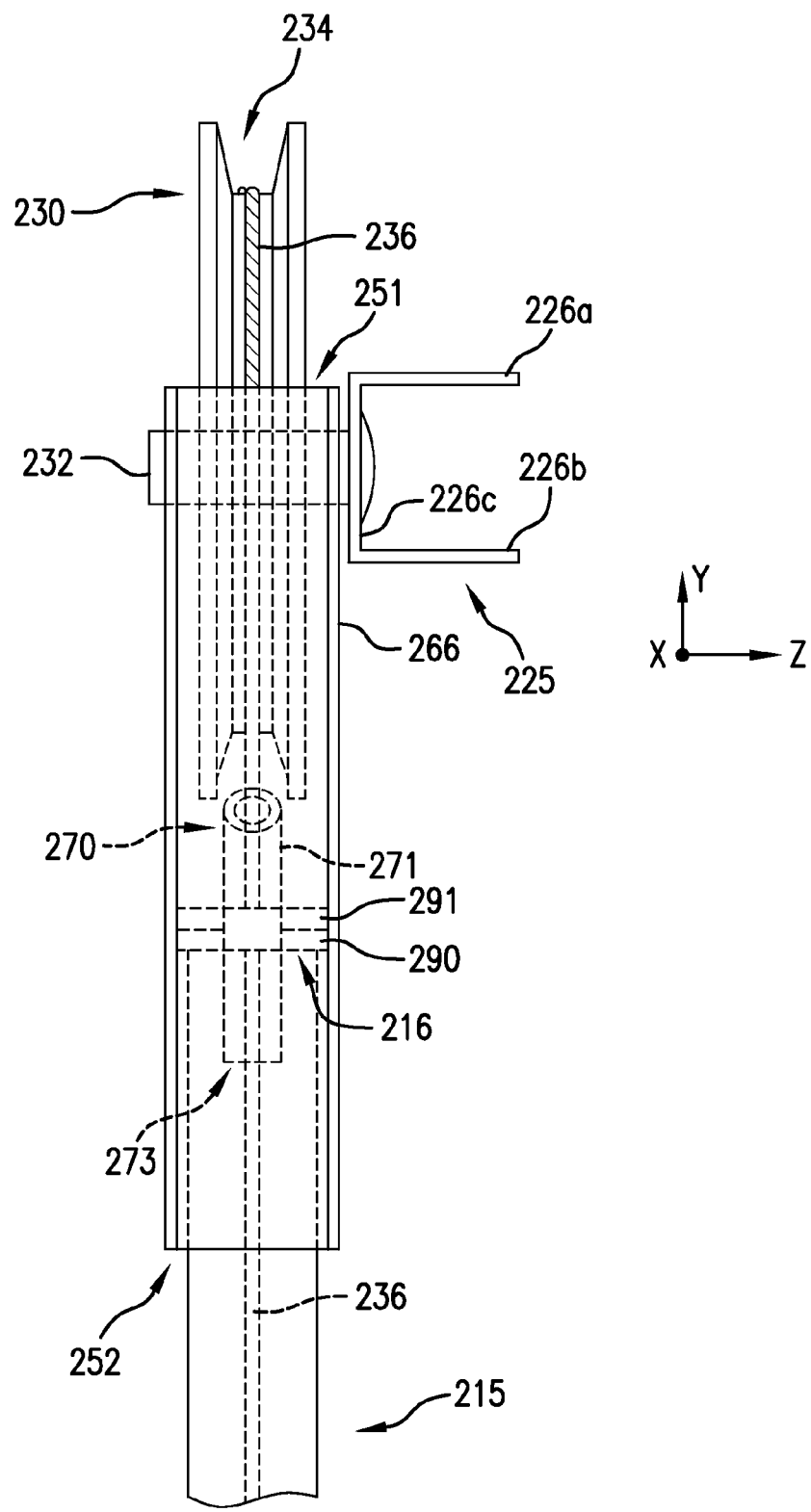

Referring now to FIGS. 2A and 2B, a valve controller head 200 is shown in detail. A top-down perspective of the controller head 200 is shown in FIG. 2A and side perspective of the same controller head 200 is shown in FIG. 2B. The valve controller head 200 can be used as a proximal head or distal head of a valve controller, or both, such as those described with respect to FIG. 1.

The valve controller head 200 is rigidly attached to a terminal end of an elongated shaft 215. In this embodiment, the head 200 includes a head housing 250 that is closed on all sides except for the terminal end 251 from which a pulley wheel 230 partially protrudes, and an opening 252 that receives the terminal end of elongated shaft 215. The head housing 200 is fastened to the terminal end (216) of the elongate shaft 215 by a plate 290 whose sides are anchored to at least two walls of the head housing, e.g., wall 265. The plate 290 includes a central bore configured to receive and secure the elongate shaft, e.g., through welding the outer surface of the elongate shaft to a surface of the plate 290.

The terminal end (216) of the elongate shaft 215 is configured to receive a wire guide 270. The wire guide 270 routes the pulley wire 236 toward, or away from a circumferential groove 234 on the pulley wheel 230 depending on the shifting direction of the pulley wire 236. For example, if the pulley wheel 230 is rotated clockwise, as illustrated in FIG. 2A, the left portion (272) of the wire guide 270 channels the pulley wire into the circumferential groove 234 on the left side of the pulley wheel 230. Correspondingly, the right portion (271) of the wire guide 270 receives the pulley wire 236 as it shifts from the right side of the pulley wheel 236 into the elongate shaft 215.

Head housing 250 includes an aperture through which a pin 232 extends to provide a rotation axis, i.e., an axle, for the pulley wheel 230. As shown in FIG. 2B, the axis of rotation of pulley wheel 230 is about the z axis. The length of pin 232 is greater than the width of the housing along the z-axis, as shown, to allow a valve control engagement member 225 to be securely attached to the pin outside of the head housing 250. The pin 232 may be attached to the engagement member 225 by way of soldering, end-capping, bolting, welding, or any other method that provides a resilient bond between the pin 232 and the engagement member 225.

Referring to FIG. 2A, in this embodiment, the circumferential groove (234) of the pulley wheel 230 includes two apertures 280, 281, through which a portion of the pulley wire 236 extends to secure the pulley wire 236 to the pulley wheel 230. Securing at least one end of the pulley wire 236 to the pulley wheel 230 allows the pulley wire 236 to be shifted as the pulley wheel 230 is rotated. In embodiment of FIG. 2A, when the pulley wire 236 is shifted, e.g., in either direction along the elongate shaft 215, the pulley wheel 230 is rotationally urged as illustrated by double-headed arrow.

Still referring to FIGS. 2A and 2B, the valve controller head 200 includes a valve control engagement member 225. The valve control engagement member 225 is configured to engage a control mechanism of a valve, such as the handle of an in-line valve used in residential and commercial plumbing systems. Such handles are often used to operate the valve between "on," "off," and intermediary positions, as described in greater detail below. The engagement member 225 shown in FIGS. 2A and 2B is an elongate U-shaped channel formed of a resilient material, such as steel, aluminum, or plastic. The floor (226c) of the engagement member 225 is securely attached to a terminal end of pin 232 so that when the pin rotates it synchronously rotates the engagement member 225. The floor 226c and side walls 226a and 226b may be formed from the same piece of resilient material, or, in some embodiments, the side walls 226a, 226b may be welded onto the floor 226c from separate pieces.

Figure 3:
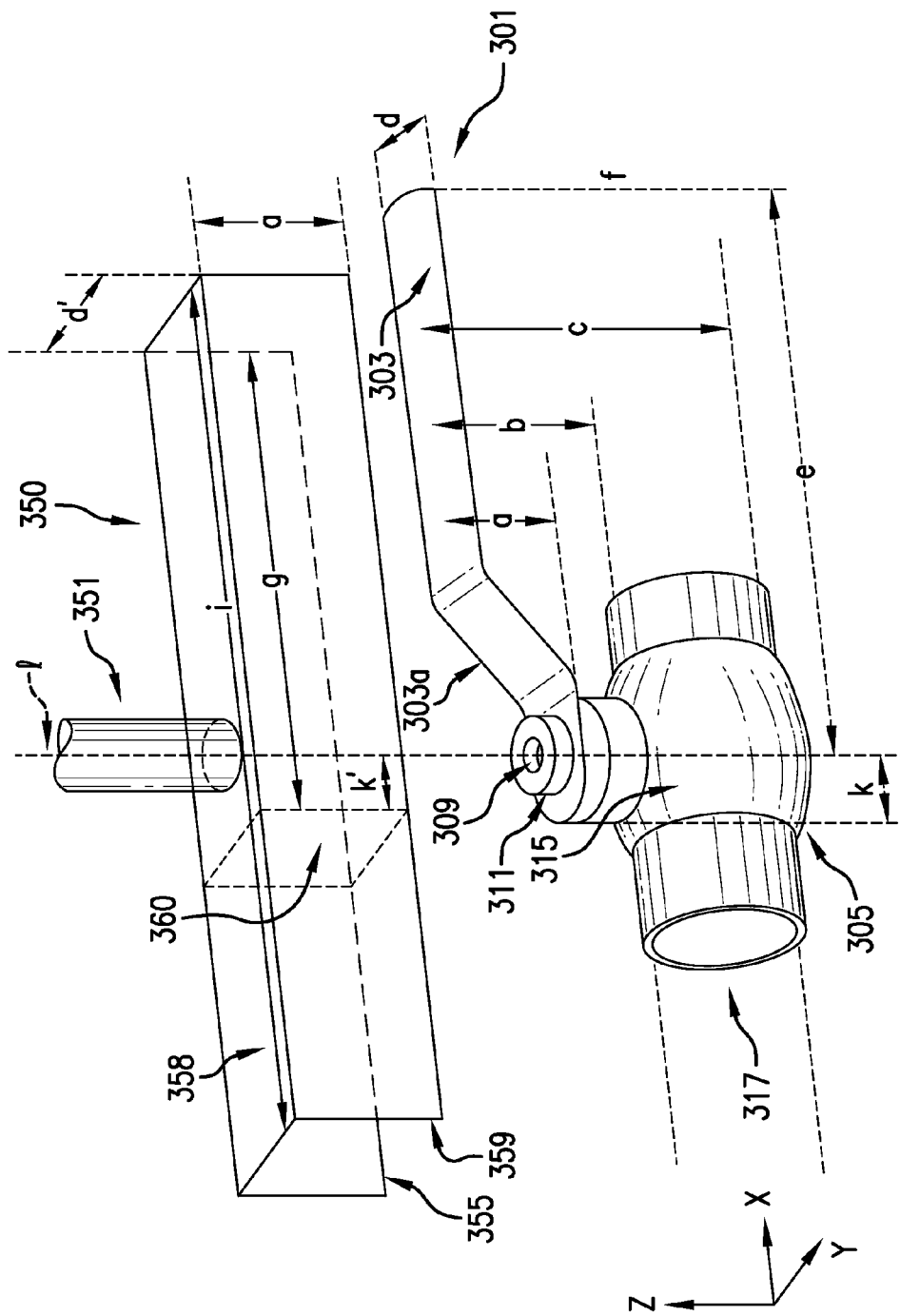
FIG. 3 shows one embodiment of a valve control engagement member in proximity to a valve.

Referring now to FIG. 3, in general, a valve controller (e.g., of the type described with respect to FIG. 1) may include a valve control engagement member 350 that is shaped and configured to fit over a control mechanism 301 of a valve 305. The control mechanism 301 of valve 305 includes a handle 303 secured to a valve stem 309 by a nut 311. Valve stem 309 extends through a valve housing 315 and is connected to a flow control member (not shown in FIG. 3) which impedes or allows flow through a channel 317.

The dimensions of the engagement member 350 can be selected, during manufacture, to allow a snug fit of the engagement member 350 over at least a portion of the control mechanism 301. For example, handle 303 includes an "S" bend 303a that raises a portion of the handle a distance a, as shown, from where the handle 303 is connected with the valve stem 309. Accordingly, the height a' of the walls 355, 359 of the engagement member 350 can be selected such that a and a' are equivalent or nearly equivalent. Such a configuration allows the engagement member 350 to fit over the control mechanism 301 and allow rotation of the control mechanism 301 without interference from valve housing 315.

Still referring to FIG. 3, pin 351 is attached to the floor 358 of the engagement member 350; rotation of the pin causes rotation of the engagement member 350 in the x-y plane, as shown. In some embodiments, the attachment position of pin 351 to the floor 358 of the engagement member 350 can be selected to provide certain mechanical advantages or to address spatial considerations with respect to positioning the engagement member 350 in proximity to a valve. In general, it can be advantageous to position the pin 351 such that the long (z) axis of the pin 351 is coaxial with the rotational axis of the valve stem 309. As shown in FIG. 3, the axis of rotation of the pin 351 and the axis of rotation of the valve stem 309 advantageously share a common axis, denoted by dashed line l. This configuration can maximize the applied torque to the control mechanism 301 to turn the valve "on," "off," or to an intermediary position between "on" and "off."

Plumbing valves in residential and commercial structures are sometimes located in areas such as recessed ceilings with little or no space around them, which may make it difficult to maneuver a control head of a valve controller (e.g., control head 140 of valve controller 100 in FIG. 1) into position. It may be further difficult to rotate an engagement member 350 for the same reasons, even if the control head can be properly positioned to control the valve. It may be advantageous, therefore, in some embodiments, to minimize the overall length i of the engagement member 350 or minimize the length of the engagement member 350 on one side of the pin 351. For example, as illustrated in FIG. 3, the length i of the engagement member 350 is greater than the distance e from the valve stem 309 to the end of the handle 303. In order to engage substantially only the handle 303 portion of the control mechanism 301, the engagement member 350 may be selected to be a shorter length g, as shown.

In another embodiment, the engagement member 350 may include a stop wall for aiding the positioning of the engagement member 350 with respect to a control mechanism 301. FIG. 3 shows a stop wall 360 positioned a distance k' from the rotational axis (l) of pin 351. The distance k' correlates to a distance k which, in FIG. 3, is the distance from terminus of the handle 303 (where it is attached to the valve stem 309) to the rotational axis (l) of the valve stem 309. The stop wall 360 can aid the user in positioning the pin 351 of the engagement member 350 coaxially with the valve stem 309 of the valve 305.

Figure 4A:
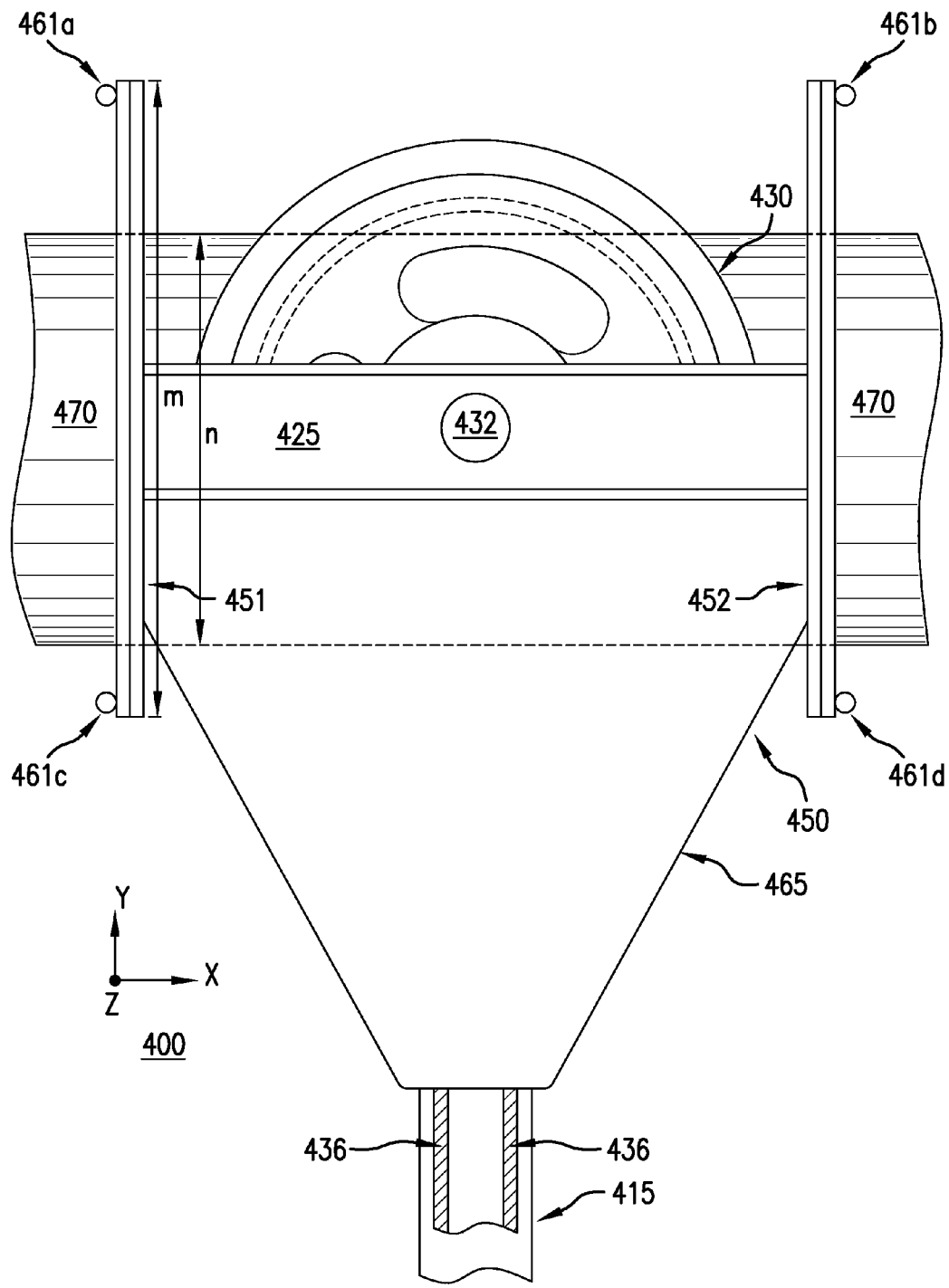
FIG. 4A is a bottom-view orthographic projection of a valve controller head, according to one embodiment.
Figure 4B:
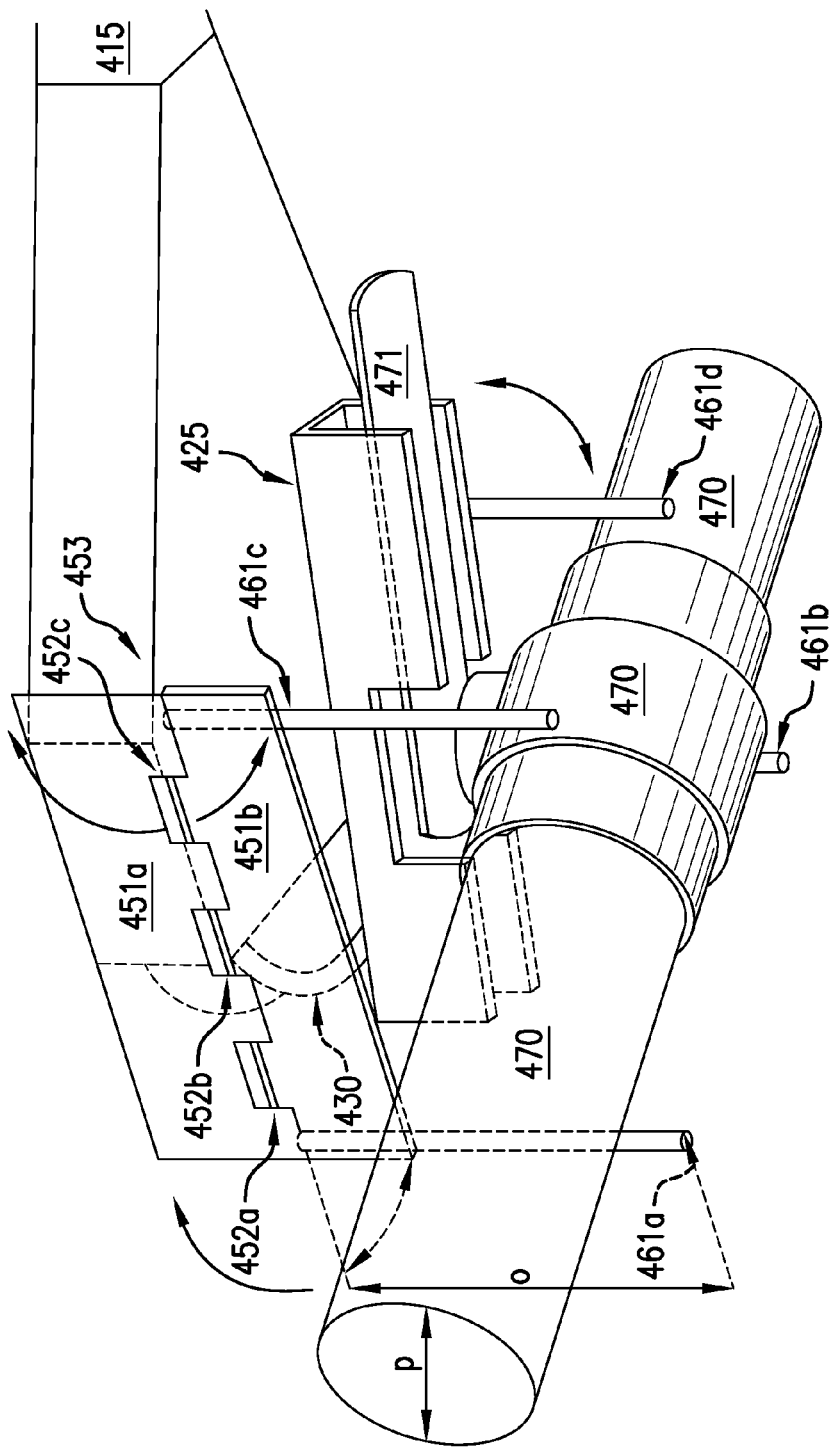
FIG. 4B is a perspective view of one embodiment of a valve controller head engaged with a valve handle.

Referring now to FIGS. 4A and 4B, a valve controller head 400 is shown. Valve controller head 400 is similar to the valve controller heads described with respect to FIGS. 1-3, and includes a head housing 450 that supports a pin 432 that provides an axis of rotation, i.e., an axle, for a pulley wheel 430. Like the previously described embodiments, pin 432 is connected to an engagement member 425 that can engage and rotate a valve control mechanism (e.g., handle 471) of a valve 470, such as an in-line ball valve. The valve controller head 400 is mounted on a terminal end of an elongate shaft 415, which has running through it, a pulley wire 436 that urges rotational motion of the pulley wheel 430 when the pulley wire 436 shifts. Valve controller head 400 can be used as a proximal or distal head in a valve controller, e.g., valve controller 100 as described with respect to FIG. 1.

FIG. 4A is a top-view orthographic projection of a valve control head 400 positioned atop a length of pipe 470. The pipe 470 includes an in-line valve (not shown in FIG. 4A for clarity), such as the in-line valve 305 described with respect to FIG. 3. In this embodiment, the valve control head 400 includes a head housing 450 that includes walls 451, 452 of length m that exceed the width n of pipe 470. Attached to the walls 451, 452, are pegs 461a-d extending in the z-dimension as illustrated in FIG. 4A. The lengths o of pegs 461a-d preferably exceed the diameter p of the pipe 470 and are configured to allow two pegs, e.g., pegs 461a and 461b to be positioned on one side of the pipe 470 while the other two pegs, 461c and 461d are positioned on an opposite side of the pipe 470.

Referring now to FIG. 4B, pegs 461a-d can provide torque resistance, reducing the likelihood that the valve controller will twist or turn when the user operates a valve control mechanism using a valve controller, e.g., valve controller 100 in FIG. 1. In other words, the pegs 461a-d can minimize the counter-torque force required to move a valve control mechanism (e.g., turn valve stem 309 in FIG. 3) that may otherwise be transferred to the person using the valve controller. Those skilled in the art of plumbing will appreciate that sometimes valves require considerable strength to operate by hand, such as valves that have been affected by rust and other corrosive processes. Pegs 461a-d can provide a mechanical torque advantage that may be used to operate stubborn valves.

In one embodiment, pegs 461a-d are hingedly connected to the valve control head 400. This arrangement allows a user to selectably deploy the pegs 461a-d when desired. As shown in FIG. 4B, the hinge 453 includes a first plate 451a and a second plate 451b hingedly connected by hinge members 452a-c, similar to a butt hinge. The pegs 461a and 461c are rigidly fixed to the second plate 451b, and the hinge may be shifted from an open position (as depicted in FIG. 4B) to a closed position. It will be understood that the valve control head 400 may include a similar hinge on the opposing side of hinge 453, as illustrated in FIG. 4B to provide selectable deployment of pegs 461b and 461d in the same manner. In the open position, pegs 461a-d extend toward, and engage the pipe 470 as described above. In the closed position, pegs 461a-d extend away from, and do not engage the pipe 470.

It will be understood that a wide variety of control mechanisms exist for various types of residential and commercial valves. The skilled artisan will appreciate that the shape and style of the engagement members described herein e.g., engagement member 425, may be modified to accommodate different shapes and styles of control mechanisms generally available. A "standard" engagement member, e.g., engagement member 425 may be formed as a U-shaped channel, and also include hardware, adhesive members, or other attachment mechanisms to receive and secure accessory engagement members having different sizes and shapes than the standard engagement member. For example, engagement member 425 can be configured to securely receive accessory engagement members that fit valve control mechanisms of different shape, such as handwheels on gate valves.

Referring now to FIGS. 4C and 4D, two exemplary accessory engagement members are illustrated. In FIG. 4C, the engagement member 425 is configured to receive accessory engagement member 480. Accessory engagement member 480 is a square tube 482 of resilient material, e.g., aluminum, copper, or steel that is sized to fit within the accessory engagement member 425. Secured to one side of the square tube 482 is a plate 484 that includes pegs 486a-d extending perpendicularly from a plane of the plate, as shown. The accessory engagement member 480 can be held within the engagement member 425 using hook-and-loop fasteners, e.g., those manufactured by Velcro USA Inc., Manchester, N.H., United States. Other permanent, and non-permanent (i.e., reversible) methods may be used to secure the accessory engagement member 480 within the engagement member 425, including the use of adhesives, glues, welding, soldering, clips, bands, and the like.

FIG. 4D illustrates a different type of accessory engagement member 490 that is similarly sized to fit within the engagement member 425. In this example, the accessory engagement member 490 has thicker side walls 491a-d than the side walls of the engagement member 425, i.e., walls 426a-d. The accessory engagement member 490 shown in FIG. 4D can be used, e.g., to control smaller valve handles, or valve handles of different shape or configuration than that of the engagement member 425. The accessory engagement member 490 can be held within the engagement member 425 using hook-and-loop fasteners, e.g., those manufactured by Velcro USA Inc., Manchester, N.H., United States. Other permanent, and non-permanent (i.e., reversible) methods may be used to secure the accessory engagement member 490 within the engagement member 425, including the use of adhesives, glues, welding, soldering, clips, bands, and the like.

Figure 4E:
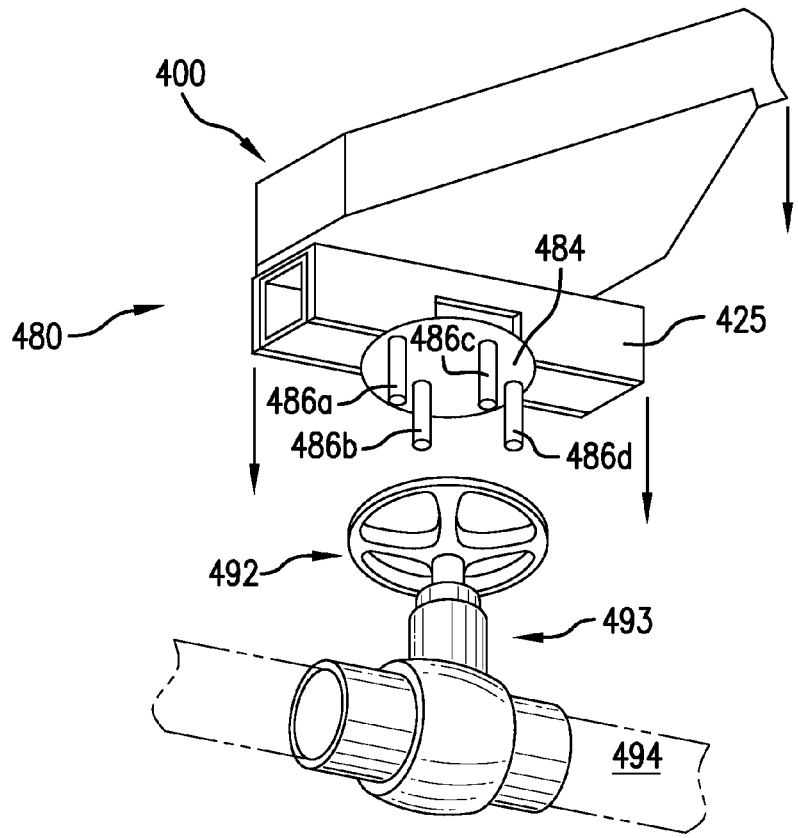
FIGS. 4E and 4F show a valve controller head and a valve control engagement member configured to operate a valve handwheel.
Figure 4F:
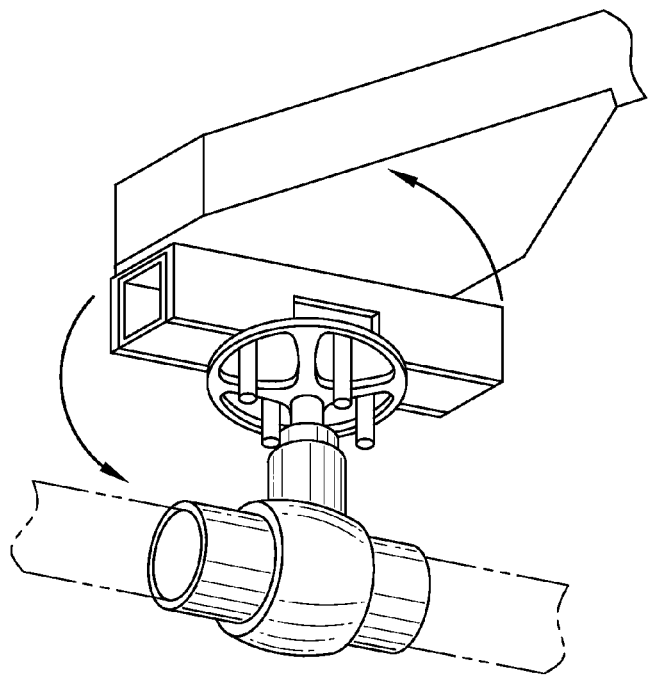

Referring now to FIGS. 4E-4F, the use of valve control head 400 with accessory engagement member 480 is illustrated. In this example, accessory engagement member 480 has been securely inserted into the engagement member 425. The user has placed the control head 400 above a handwheel 492 that controls an in-line valve 493 connected to a pipe 494. The pegs 486a-d are positioned to extend through the spaces between the spokes of the handwheel 492 and the control head is lowered in the direction of the arrows as shown. FIG. 4F illustrates the proximity of the control head 400 and accessory engagement member 480 in the engaged position. As the user activates the pulley wheel in the proximal head as described above, the pulley wheel in the distal control head 400 is synchronously activated and causes the engagement member 425 and the accessory engagement member 480 to turn. As the accessory engagement member 480 turns, the pegs 486a-d engage the spokes of the handwheel 492, causing the handwheel to rotate, thus shifting the valve 493 to a desired position, e.g., "on," or "off."

Figure 5A:
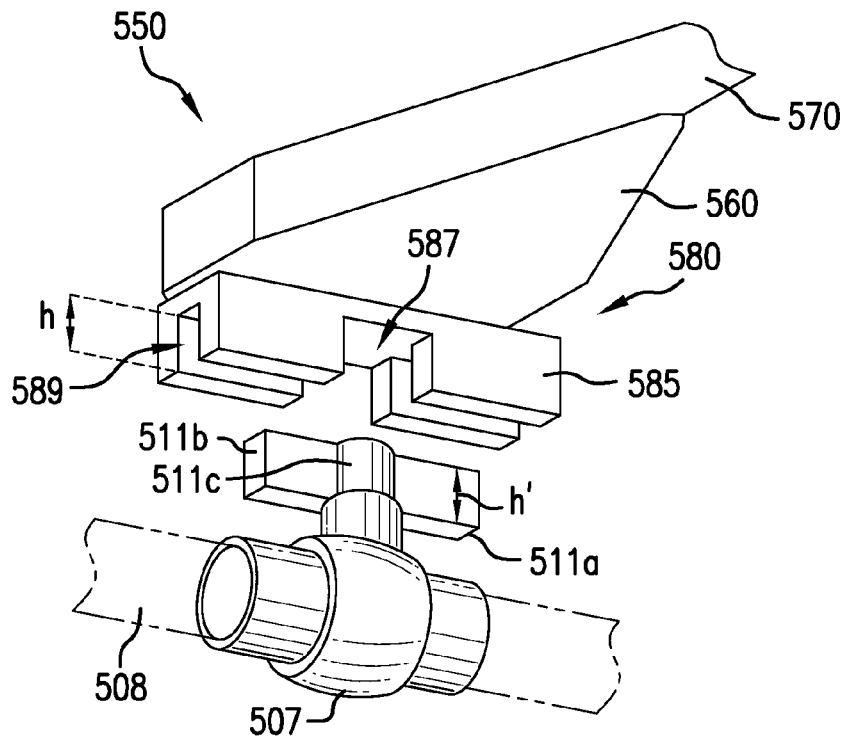
FIGS. 5A-5C show one embodiment of a valve controller head and a method for operating a valve using a valve controller.
Figure 5B:
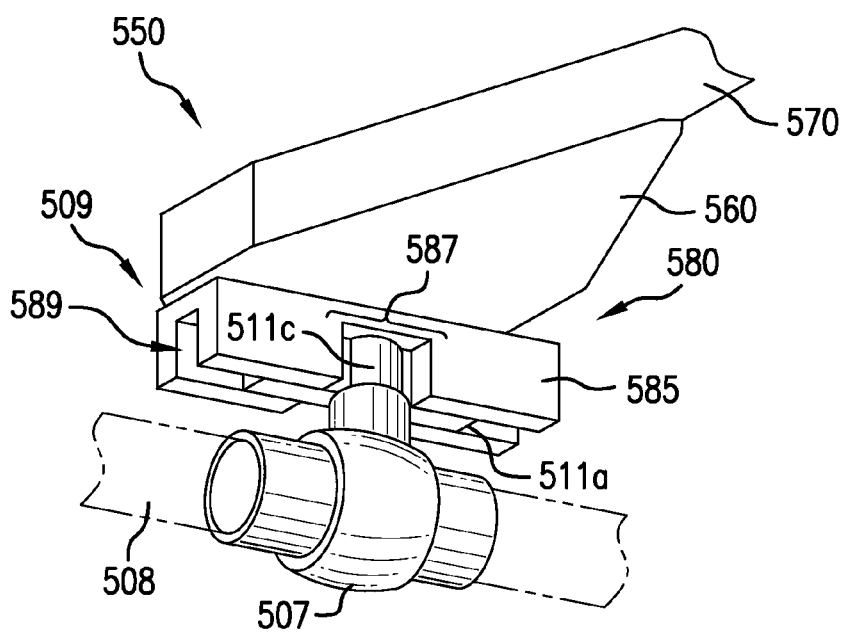
Figure 5C:
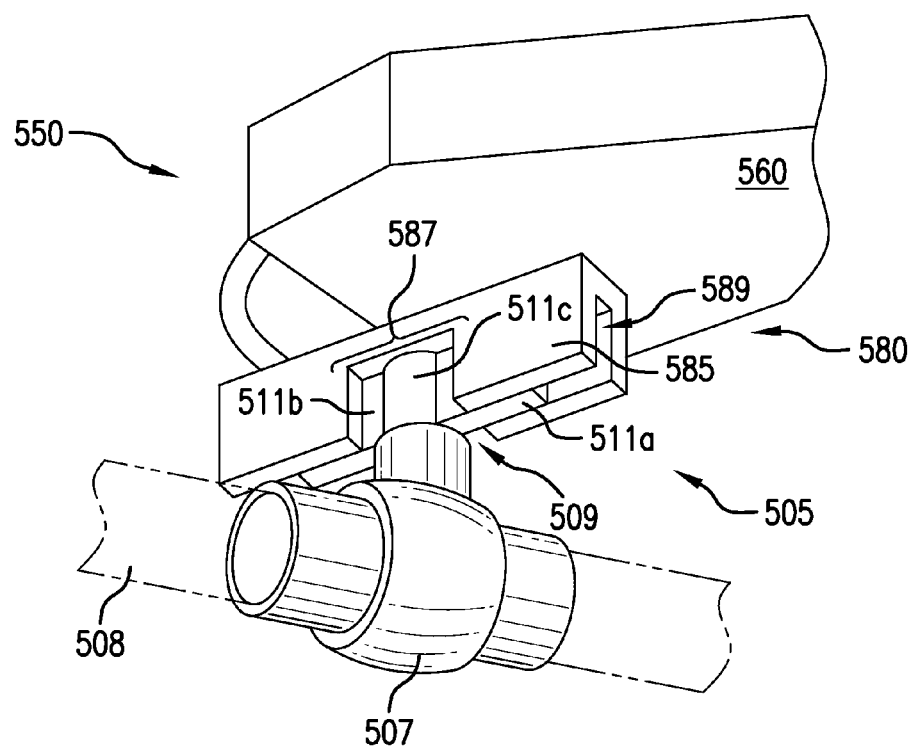

Referring now to FIGS. 5A-5C, a valve controller similar to that described with respect to FIG. 1 can be used to manipulate a valve control mechanism. FIG. 5A shows a distal valve controller head 550 operably connected to an elongate shaft 570, which itself is operably connected to a proximal head (not shown in FIGS. 5A-5C for clarity) similar to valve controller 100 in FIG. 1. The distal valve controller head 550 in FIGS. 5A-5C is substantially equivalent to the valve controller head 200 described in FIGS. 2A-2B, however, many of the parts are not shown in FIGS. 5A-5C for clarity.

In this example, a user can hold the valve controller by hand, positioning the distal valve controller head 550 proximal to a valve 505. The valve 505 includes a valve body 507 that is coupled to a pipe 508 (shown as a dashed line). Like the valves described above, valve 505 includes an adjustable flow regulator (not shown in FIGS. 5A-5C) that can limit or stop a flow of fluid through the valve body 507 depending on its position. An example of this type of valve is a ball valve. A valve control tee-handle 509 includes a main body 511c rigidly coupled to a valve stem (not shown in FIGS. 5A-5C) that turns the adjustable flow regulator to an "on," "off," or intermediary position between on and off. The tee-handle 509 includes wings 511a, 511b that extend from the main body 511c; such handles are common to residential, commercial, and industrial flow valves and allow a user to grip and operate the valve control tee-handle 509.

The distal valve controller head 550 includes an engagement member 580 coupled to a head housing 560 via a pin (not shown in FIGS. 5A-5C) similar to the embodiments described above. The engagement member 580 can be configured so as to provide positive engagement with the valve control handle 509 when the valve controller head 550 is lowered onto the valve 505. In this embodiment, the engagement member 580 is a U-shaped block 585 that includes two intersecting channels, indicated by reference numerals 587 and 589, which generally extends through the middle portions of the long and short axes of the block 585. The length-wise channel 589 has a width to accommodate insertion of the wings 511a, 511b of the FIGS. 5A and 5B show the valve 505 in an "open" position where the wings 511a, 511b of the valve handle 509 are parallel with the direction of flow through the valve body 507. From the "on" valve position illustrated in FIG. 5B, the user can remotely operate the valve handle 509 to the "off" position shown in FIG. 5C. To remotely operate the valve control handle 509, the user lowers the controller head 550 onto the valve 505 such that the channels 589, 587 of the engagement member 580 receive the wings 511a, 511b and body 511c of the handle, respectively. The user then grasps the proximal engagement member of the valve controller (e.g., engagement member 125 in FIG. 1) and rotates it approximately ninety degrees. Rotation of the proximal engagement member rotates the proximal pulley wheel, which causes shifting of the pulley wire. The shifting of pulley wire produces rotation of the distal pulley wheel and pin, which rotates the distal engagement member 580.

The user can turn the valve handle 509 to any position within its working range by corresponding rotation of the proximal engagement member. When the desired valve position has been achieved, the user can lift the controller head 550 off of the valve 505.

Figure 5D:
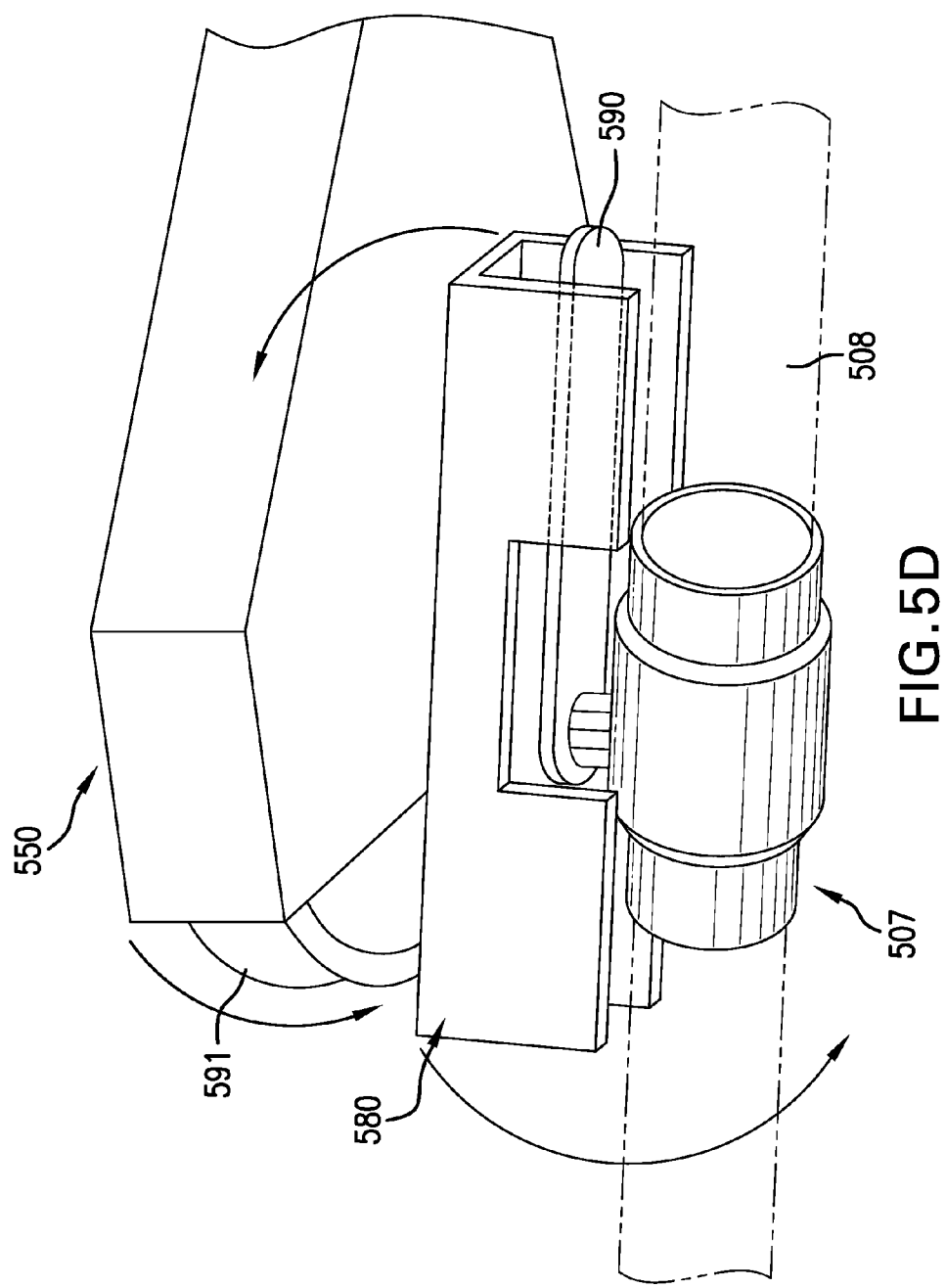

Referring to FIGS. 5D and 5E, an exemplary use of a valve controller is shown to control a valve with a different type of handle than that shown in FIGS. 5A-5C. In FIG. 5D, the valve is activated by an elongate lever 590, similar to those commonly used for ball valves. In this example, the engagement member 580 receives the handle 590 as described above; the user can position the valve controller 550 to coaxially align the rotation axis of the valve stem and the pin controller head pin that is attached to the engagement member for optimum torque advantage. As described above, the user can cause rotation of the proximal head pulley (not shown in FIG. 5D) of the valve controller to cause the pulley 591 of the distal controller head to rotate in the direction indicated. Referring now to FIG. 5E, the valve is shown in a "closed" position after the engagement member has been rotated ninety degrees from the "open" position illustrated in FIG. 5D. The user can rotate the handle 590 back to the "open" position by rotating the proximal pulley head in the opposite direction as that to cause opening of the valve, as illustrated.

In the foregoing example, the distal head (110 in FIG. 1) of the valve controller was used to operate a valve. Referring again to FIG. 1, this arrangement may be particularly advantageous when the user wishes to control valves running horizontally within a structure, such as plumbing pipes that run horizontally within ceilings. The location of angled shaft section 160 and the selected angle φ of the bend allow a user to operate a valve ergonomically and from a natural standing position. One will appreciate, however, that often times valves, such as plumbing valves, are mounted vertically on walls and configured to control vertical fluid flow.

A user can operate a vertically-mounted valve using a method similar to that just described for a horizontally-mounted valve. In this case, however, it may be more feasible to use what has been described to this point as the proximal head 105 to manipulate a valve control, i.e., to reverse the orientation of the valve controller 100 with respect to the end held by the operator. In this way, the engagement member 125 of the (now distal) head 105 can engage a vertically-oriented valve control in the manner previously described. The valve controller heads 105, 110 in FIG. 1 face in opposing directions; when the valve controller 100 is positioned to control a vertically-oriented valve, the (now proximal) head 110 faces "up," (from the user's perspective) allowing the user to easily access and rotate the engagement member 120.

Figure 6A:
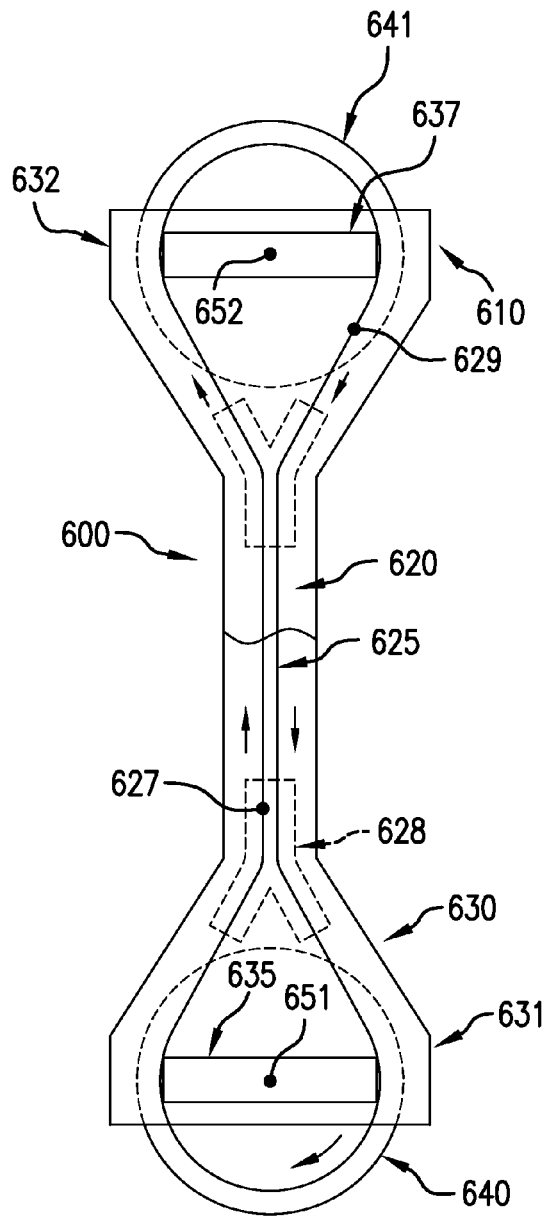
FIGS. 6A-6B show working components of a valve controller, according to one embodiment.
Figure 6B:
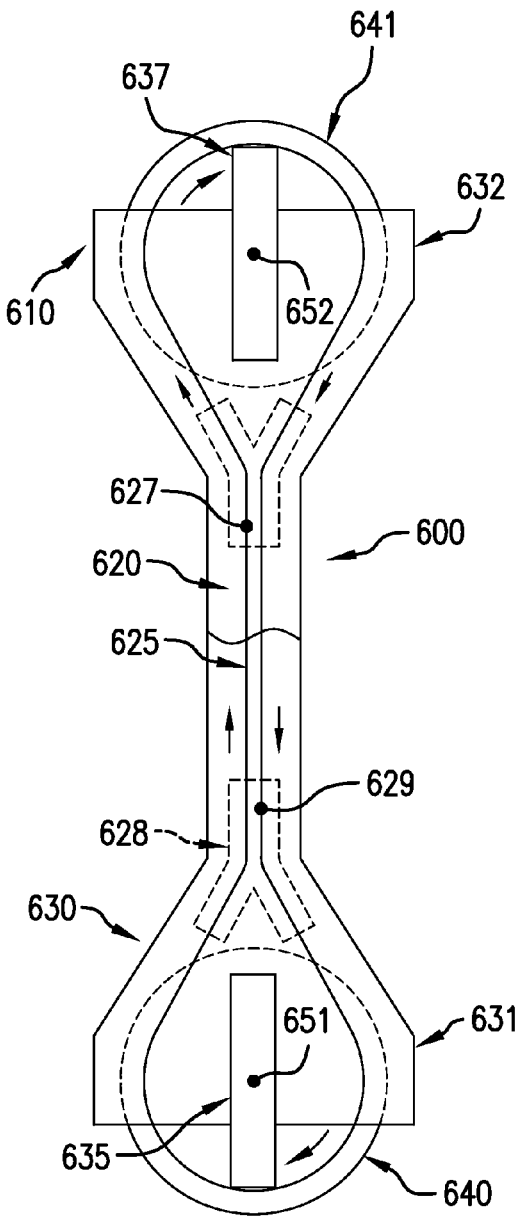

Referring now to FIGS. 6A and 6B, some components of a valve controller 600 are shown to illustrate how synchronous rotation is achieved between proximal and distal engagement members, according to one embodiment. FIGS. 6A-6B are drawn to highlight some of the components of the proximal (630) and distal (610) controller heads; an elongate shaft 620 is illustrated with a portion removed for clarity of the internal and external moving parts of the controller heads 610, 630. The valve controller heads 610, 630 are rigidly connected to an elongate shaft 620. The proximal (630) and distal (610) controller heads each include a proximal (631) and distal (632) head housing. A proximal (635) and distal (637) pulley wheel is rotatably supported within each of the proximal and distal head housings (631, 632) by In this embodiment, a toothed pulley belt 625 forms a loop that extends from the proximal pulley wheel 640 to the distal pulley wheel 641, where the toothed pulley belt 625 engages matched-tooth notches formed on a circumferential rim surface of each pulley wheel 640, 641. The pulley belt 625 passes through proximal (628) and distal (626) belt directors which are positioned in the interface between the elongate shaft 620 and the proximal (630) and distal (610) controller heads. The belt directors 626, 628 channel the pulley belt 625 to or from the pulley wheels 640, 641, depending on which direction the pulley belt 625 is shifted.

In the following exemplary operation of the valve controller 600, a user can hold the valve controller 600 with the proximal controller head 630 nearest to their person. The distal controller head 610 can be used to operate a valve located remotely from the user. The user can position the distal head housing 632 over a valve control, such as a valve handle on a ball valve (not shown in FIG. 6). The user can lower the distal head housing 632 to positively engage the distal engagement member 637 with the valve handle, as was described above with respect to FIGS. 5A-5B.

The user can then rotate the proximal engagement member 635 which synchronously rotates the pin 651 and the pulley wheel 640. The teeth of the pulley belt 625 engage with the matched-tooth notches of the pulley wheel 640 which shifts the pulley belt 625. Referring to FIG. 6A, two reference points 627, 629 are indicated on the pulley belt 625 that indicate a position of the pulley belt 625 when the engagement member 635 is in the position as illustrated. As the user rotates the engagement member 635 in the direction indicated by the curved arrow (i.e., clockwise), the pulley belt shifts such that reference point 627 moves toward the distal controller head 610. Accordingly, reference point 629 on the pulley belt 625 shifts in the direction indicated by the arrow, toward the proximal controller head 630. The pulley belt 625 is engaged with the distal pulley wheel 641 in the same manner as the proximal pulley wheel 640; thus the shifting of the pulley belt 625 drives rotation of the distal pulley wheel 641 and, correspondingly, the distal pin 652 and engagement member 637.

Referring now to FIG. 6B, the configuration of the valve controller 600 is shown after rotating the proximal engagement member 635 clockwise ninety degrees (using the perspective as illustrated in FIGS. 6A-6B). The pulley belt 625 has shifted as indicated by the positions of the reference points 627, 629, relative to the positions shown in FIG. 6A, and the distal engagement member 637 has rotated ninety degrees.

A user can rotate the proximal engagement member 635 to any position to affect a corresponding position of a control valve handle that is in positive engagement with a distal head (610) engagement member 637. Those skilled in the art will recognize that some residential, industrial, and commercially-available control valves, such as ball valves, are operable by rotating a control handle approximately ninety degrees. Some other valves, however, have control handles that rotate 180 degrees; and still other valves have control handles that rotate greater than 360 degrees (including continuously rotating) to operate the valve. It will be understood that the preceding exemplary use of valve controller 600 to rotate a valve control handle ninety degrees can be extended to operating valves having control handles that turn 180 degrees, or that rotate continuously, such as a handwheel on a gate valve.

The valve controllers described and illustrated heretofore include a single, substantially similar pulley wheel housed within each of the proximal and distal head housings, respectively. In some embodiments, however, valve controllers can include pulley wheels of different size or tooth, or different size and tooth count, count to provide a desired mechanical advantage through a gear ratio. It will be understood that a "drive ratio" may also be chosen through selection of appropriate pulleys and belts; the drive ratio is a ratio of pitch diameters of differing pulleys, and is a ratio by which torque is increased and speed is decreased, or vice-versa.

For example, a proximal head housing may include a pulley wheel having ten teeth; a distal head housing may include a larger-diameter pulley wheel having 50 teeth for a resulting gear ratio of 5:1. Using a chain- or toothed-belt drive to couple rotation between the pulleys, such a configuration can provide the user a five-fold increase in torque to the distal pin 652 and correspondingly to the distal engagement member 637.

In some embodiments, one or both of the head housings can include a stepped pulley system, similar to stepped pulley systems used in variable speed drill presses, to select a desired gear ratio. A stepped pulley system can include a drive belt, e.g., a "V" belt, and two or more pulleys of differing diameter mounted on a common axial shaft (e.g., pin 652). In such embodiments, one or both of the head housings can include a channel that allows the stepped pulley system to slide back and forth to allow the user to place the belt around a chosen pulley. Once the belt is placed around the chosen pulley, the user can slide the pulley system into a position providing adequate belt tension and use a locking mechanism to secure the pulley system in place.

In one embodiment of a valve controller, the distal controller head (i.e., the controller head used to operate a valve) includes a pulley wheel having one or more, preferably two or more, dowels, pins, or rods that extend perpendicularly from the plane of rotation of the pulley wheel. The dowels, pins, or rods can be oriented such that they are spaced apart from each other, preferably on opposite sides of the pulley wheel but extending from the same face of the pulley wheel. In such an embodiment, the dowels, pins, or rods can engage a control mechanism (e.g., a lever) of a valve directly. An example of a valve control mechanism that can be operated using this embodiment includes a winged, or "tee" handle ball valve similar to tee-handle 509 shown in FIGS. 5A-5C. Another example includes positioning the dowels, pins, or rods through apertures in a handwheel (e.g., in-between spokes of the handwheel) so that rotation of the pulley wheel causes contact between the dowels, pins, or rods with the spokes and urges rotation of the handwheel.

Valve controllers of the type described herein provide numerous advantages. For example, in some residential, commercial, and industrial structures, plumbing exists within a ceiling recess that is often located out-of-reach of a contractor or plumber who wishes to operate an in-line valve. It can be tedious and time-consuming to deploy a ladder, ascend the ladder, and operate the valve by hand each time the contractor or plumber wishes to open or close a valve. The risk of injury from falling off of a ladder increases each time one is used for such a purpose. Using a valve controller of the types described herein, a user may simply approach an out-of-reach valve, extend the valve controller to the valve control, and operate Another advantage includes the ability to operate valve controls (e.g., valve handles) that are difficult to move by hand as a result of rust, design, or other reasons.

Another advantage includes the ability to remotely operate valve controls having different valve control handles and the like, using the same valve controller. Valve controller engagement members of the type described herein can be configured to accept interchangeable accessories that are custom fit to engage different types of handles and valve controls.

A number of illustrative embodiments have been described. Nevertheless, it will be understood that modifications may be made without departing from the spirit and scope of the various embodiments presented herein. For example, while heretofore it has been explained that rotation of a distal engagement member (e.g., distal engagement member 637 in FIG. 6) is, in part, accomplished by rotating a proximal engagement member (e.g., proximal engagement member 635), it will be understood that an alternative structure for rotating the distal pulley wheel is equally contemplated using, e.g., a lever. In such an embodiment, a lever can be fastened at an angle to the axial shaft of the proximal pulley wheel, e.g., pulley wheel 640 in FIG. 6. Shifting the lever in a selected direction causes rotation of the proximal pulley wheel and corresponding rotation of the distal pulley wheel and engagement member (e.g., 641 and 637 in FIG. 6) in a similar fashion as described above. Using a lever in lieu of an engagement member on the proximal controller head (e.g., controller head 630 in FIG. 6) may allow application of greater torque to the proximal pulley wheel and, correspondingly, to the distal pulley wheel and engagement member. A lever may aid users who suffer from musculoskeletal disorders such as arthritis, in that a lever can allow use of larger muscle groups in the arms and shoulders as opposed to the wrist to rotate the proximal engagement member.

In yet another example, a valve controller may be operated by an external engine or battery power. For example, a powered rotatable shaft of a small electric motor may be coupled to the proximal pin (e.g., pin 651 in FIG. 6) to rotate the proximal pulley wheel (e.g., The type of materials used in the foregoing illustrative embodiments can be selected by the user or manufacturer depending on the intended use of the device. For example, the proximal and distal head housings, pulley wheels, pins, and engagement members can be formed of steel, aluminum, and other metals or they can be formed from a rigid plastic or other polymeric material to reduce the overall weight. Exemplary elongate shaft materials include metal and plastic conduit.

In some embodiments, the elongate shaft includes eyelets or other guide members to keep the pulley wire or pulley belt, depending on the article used, from frictionally engaging the walls and other portions of the valve controller.

It will be understood that a large number of residential, industrial, and commercially-available valves can be controlled by a valve controller of the type described herein. Exemplary valves of this type include, but are not limited to: ball valves, including in-line ball valves, butterfly valves, globe valves, plug valves, gate valves, and needle valves. In most cases, any valve with an external handle can be operated by one or more of the described valve controller embodiments. It will be understood that custom accessory engagement members may be used to fit practically any type of valve control handle, which can be securely fastened within a valve control engagement member as described above. Thus, a wide variety of valves can be operated by the valve controller using accessory engagement members. Accordingly, other embodiments are within the scope of the following claims.

What is claimed is:

1. A hand-held, portable valve controller, comprising:
a first head housing and a second head housing, each of the first and second head housings comprising first and second housing walls and a pulley wheel supported by an axle having first and second end portions, wherein the first axle end portion is fastened to the first wall and the second axle end portion extends through the second wall, wherein the second axle end portion is fastened to a valve control engagement member configured to receive a valve control member operable to control a valve from a first valve position to a second valve position;
a rigid, hollow elongate shaft that conjoins the first and second head housings and is configured for being grasped by a hand of a user to provide the capability of manually engaging the valve control member with the valve control engagement member; and
a cord that extends through the elongate shaft and around a circumferential portion of each of the pulley wheels in the first and second head housings configured to transfer rotational motion from the pulley wheel in the first head housing to the pulley wheel in the second head housing so as to provide the user capability of selectively shifting the control valve from the first valve position to the second valve position.

2. The valve controller of claim 1, wherein rotation of the pulley wheels causes concurrent rotation of each of the valve control engagement members about a rotation axis substantially coaxial with a rotation axis of the axle.

3. The valve controller of claim 1, wherein a portion of the elongate shaft comprises a bend configured to allow the first valve control engagement member to be rotated in a different plane of rotation than the second valve control engagement member.

4. The valve controller of claim 1, wherein the hollow elongate shaft comprises two or more hollow shaft portions conjoined by a joint member that provides the capability of selectively varying a bend angle of the elongate shaft.

5. The valve controller of claim 1, wherein the circumference of each pulley wheel is different.

6. The valve controller of claim 1, wherein the cord is a rope, chain, cable, belt, or wire that shifts in response to rotation of the first pulley wheel and produces concurrent rotation in the second pulley wheel.

7. The valve controller of claim 1, wherein the valve control engagement member is configured to receive a valve handle that is rotatably operable to regulate fluid flow through the valve.

8. The valve controller of claim 7, wherein the valve control engagement member is an elongate, substantially U-shaped member.

9. The valve controller of claim 8, wherein the axis of rotation of the valve control engagement member is located substantially at the mid-length of the U-shaped member.

10. The valve controller of claim 7 wherein the valve control engagement member is configured to receive the control handle of a ball valve, butterfly valve, globe valve, plug valve, or gate valve.

11. The valve controller of claim 7 wherein the valve handle is a lever or a hand wheel.

12. The valve controller of claim 7, wherein the valve control engagement member is configured to securely receive an accessory engagement member for providing the capability of operating a valve handle that is different than the valve handle the valve control engagement member is configured to receive.

13. The valve controller of claim 1, wherein the first valve control engagement member and the second valve control engagement member are on opposite sides of a plane defined by the long axis of the elongate shaft.

14. The valve controller of claim 1, wherein the pulley wheels are continuously rotatable.

15. The valve controller of claim 1, further comprising one or more pegs extending perpendicularly from the first wall or the second wall, wherein the one or more pegs are configured to engage a pipe coupled to the valve to reduce counter-torque produced by rotating the valve control member.

16. The valve controller of claim 1, wherein the elongate shaft is telescopic, so as to provide adjustment in the reach of the valve controller.

17. A method for operating a valve, comprising:
providing a hand-held, portable valve controller comprising: a first head housing and a second head housing, each of the first and second head housings comprising first and second housing walls and a pulley wheel supported by an axle having first and second end portions, wherein the first axle end portion is fastened to the first wall and the second axle end portion extends through the second wall, wherein the second axle end portion is fastened to a valve control engagement member configured to receive a valve control member operable to control a valve from a first valve position to a second valve position; a rigid, hollow elongate shaft that conjoins the first and second head housings and is configured for being grasped by a hand of a user to provide the capability of manually engaging the valve control member with the valve control engagement member; and a cord that extends through the elongate shaft and around a circumferential portion of each of the pulley wheels in the first and second head housings configured to transfer rotational motion from the pulley wheel in the first head housing to the pulley wheel in the second head housing so as to provide the user capability of selectively shifting the control valve from the first valve position to the second valve position;
engaging the valve control engagement member of the first head housing with a valve handle capable of shifting between a first valve handle position and a second valve handle position;
rotating the pulley wheel of the second housing in a selected direction to cause the engagement member of the first head housing to rotate, and concurrently shift the valve handle between the first valve handle position and the second valve handle position.

18. The method of claim 17, wherein the rotating the pulley wheel of the second housing is accomplished by rotating the second engagement member, or a lever, rigidly fastened to the axle of the second housing.

19. The method of claim 17, further comprising attaching an accessory engagement member to the valve control engagement member, wherein the accessory engagement member is configured to receive a valve handle of different size or shape than the valve control engagement member is configured to receive.

20. The method of claim 17, wherein the valve control engagement member is configured to receive the control handle of a ball valve, butterfly valve, globe valve, plug valve, or gate valve.

21. The method of claim 17, wherein the first valve handle position is one that prevents fluid flow through the valve and the second valve handle position is one that permits partial fluid flow or complete fluid flow through the valve.

22. A valve controller for operating a valve handle from a first operating position to a second operating position, comprising:
- a first valve controller head, comprising a first rotatable pulley wheel supported by a first axle that extends through first and second walls of the first valve controller head, and a first rotatable valve control engagement member attached to a terminal end of the first axle; and
- a second valve controller head, comprising a second rotatable pulley wheel supported by a second axle that extends through first and second walls of the second valve controller head, and a second rotatable valve control engagement member attached to a terminal end of the second axle;
- wherein the first and the second valve controller heads are attached on opposite terminal ends of a rigid elongate hollow shaft such that the first and the second valve control engagement members are on opposite sides of the elongate hollow shaft;
- wherein a cord is configured to transfer rotational motion from the first pulley wheel to the second pulley wheel by simultaneously engaging an outer circumference of each of the first and the second pulley wheels; and
  - wherein the cord runs through the hollow elongate hollow shaft; and
- wherein the first and second valve control engagement members are configured to receive the valve handle to operate the valve handle from the first operating position to the second operating position and said rigid hollow elongate shaft is configured for being grasped by a hand of a user to provide the capability of manually engaging the valve control handle with one of the first or second valve control engagement members.

23. The valve controller of claim 22, wherein the rigid hollow elongate shaft is formed of two or more hollow shaft pieces joined by an adjustable-angle elbow joint for selecting a bend angle of the rigid hollow elongate shaft, and wherein the adjustable-angle elbow joint is configured to allow the cord to run therethrough.

24. The valve controller of claim 22, wherein the first and the second valve control engagement members are configured to receive accessory valve control engagement members configured to receive valve handles of different type, shape or size than the first or second valve control engagement members.

* * * * *